United States Patent
Yuan et al.

(10) Patent No.: US 10,443,219 B2
(45) Date of Patent: Oct. 15, 2019

(54) FAUCETS PROVIDING WATER-AND-AIR FLOW

(71) Applicant: GLOBAL UNION INDUSTRIAL CORP., Taichung (TW)

(72) Inventors: Chiahua Yuan, Taichung (TW); Yiping Lin, Taichung (TW); Huiling Chiu, Taichung (TW); Yuanhao Chang, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 17 days.

(21) Appl. No.: 15/894,838

(22) Filed: Feb. 12, 2018

(65) Prior Publication Data

US 2018/0163382 A1 Jun. 14, 2018

Related U.S. Application Data

(63) Continuation-in-part of application No. 15/189,087, filed on Jun. 22, 2016.

(51) Int. Cl.
*E03C 1/122* (2006.01)
*E03C 1/086* (2006.01)
(Continued)

(52) U.S. Cl.
CPC .............. *E03C 1/1225* (2013.01); *B05B 1/04* (2013.01); *B05B 1/046* (2013.01); *B05B 1/16* (2013.01);
(Continued)

(58) Field of Classification Search
CPC ................... E03C 1/084; E03C 1/0404; E03C 2001/0415; E03C 2001/0417;
(Continued)

(56) References Cited

U.S. PATENT DOCUMENTS 3,212,751 A * 10/1965 Hassa .................. F16K 31/086
251/129.03
3,580,503 A 5/1971 Ligon et al.
(Continued)

FOREIGN PATENT DOCUMENTS

CN 205331574 U 6/2016
CN 205479654 U 8/2016
(Continued)

OTHER PUBLICATIONS

Extended European Search Report pursuant to Rule 62 EPC, the European Search Report (R. 61 EPC) or the partial European Search Report/Declaration of no search (R. 63 EPC) and the European Search Opinion issued in corresponding Foreign Application No. 16184186.1-1606 (9 pgs.).

*Primary Examiner* — Mariana A Tietjen
*Assistant Examiner* — Frederick D Soski
(74) *Attorney, Agent, or Firm* — Alan D. Kamrath; Mayer & Williams PC

(57) ABSTRACT

A faucet having a faucet base, a water hose, a faucet head, and a chamber is provided. A water valve is provided in the chamber and includes a driving member and a control valve movable between a first position enabling mixing of water and air and a second position enabling shut-off of a water flow. The faucet head further includes a control member movably coupled with the faucet head to enable operating the control valve within the water valve using magnets by operating the control member from or near a side of the faucet head.

5 Claims, 10 Drawing Sheets

(51) Int. Cl.
- *B05B 1/04* (2006.01)
- *B05B 1/16* (2006.01)
- *E03C 1/084* (2006.01)
- *F16K 31/528* (2006.01)
- *E03C 1/04* (2006.01)
- *F16K 21/06* (2006.01)
- *B05B 1/12* (2006.01)
- *B05B 1/30* (2006.01)
- *B05B 7/04* (2006.01)
- *B05B 12/00* (2018.01)

(52) U.S. Cl.
CPC ............ *B05B 1/1681* (2013.01); *E03C 1/084* (2013.01); *E03C 1/086* (2013.01); *E03C 1/122* (2013.01); *B05B 1/12* (2013.01); *B05B 1/1618* (2013.01); *B05B 1/304* (2013.01); *B05B 7/0425* (2013.01); *B05B 12/002* (2013.01); *E03C 1/0404* (2013.01); *E03C 2001/0415* (2013.01); *F16K 21/06* (2013.01); *F16K 31/5286* (2013.01); *Y02A 20/202* (2018.01); *Y02A 20/411* (2018.01); *Y10T 137/9464* (2015.04)

(58) Field of Classification Search
CPC ............ E03C 1/0405; E03C 2001/026; E03C 1/1225; E03C 1/086; B05B 1/02; B05B 31/44; B05B 12/002; B05B 1/04; B05B 1/046; B05B 1/1681; B05B 1/16; Y10T 137/9464; F16K 21/06; F16K 31/52458; F16K 31/5284; F15K 31/5286
USPC .................................................. 251/65, 340
See application file for complete search history.

(56) References Cited

U.S. PATENT DOCUMENTS

| | | | | |
|---|---|---|---|---|
| 3,609,425 | A | * | 9/1971 | Sheridan ................ H02K 49/10 251/65 |
| 4,624,443 | A | * | 11/1986 | Eidsmore ................ F16K 17/24 137/460 |
| 4,792,113 | A | * | 12/1988 | Eidsmore ................ F16K 17/24 137/460 |
| 5,039,061 | A | * | 8/1991 | Heard .................... F16K 31/086 137/553 |
| 6,131,608 | A | | 10/2000 | Lu |
| 6,786,237 | B2 | * | 9/2004 | Yajima ................ F15B 13/0402 137/554 |
| 8,757,518 | B2 | | 6/2014 | Kao et al. |
| 9,708,800 | B2 | * | 7/2017 | Bosio .................... E03C 1/0404 |
| 2007/0069169 | A1 | | 3/2007 | Lin |
| 2010/0006788 | A1 | * | 1/2010 | Tanner .................... B64D 13/02 251/65 |
| 2011/0049273 | A1 | | 3/2011 | Huang |
| 2016/0222635 | A1 | | 8/2016 | Yuan et al. |
| 2017/0058496 | A1 | | 3/2017 | Chiu et al. |
| 2017/0059050 | A1 | | 3/2017 | Chiu et al. |
| 2017/0059051 | A1 | | 3/2017 | Chiu et al. |

FOREIGN PATENT DOCUMENTS

| | | |
|---|---|---|
| CN | 205745594 U | 11/2016 |
| CN | 206054896 U | 3/2017 |
| CN | 104879556 B | 6/2017 |
| CN | 206320347 U | 7/2017 |
| CN | 206338480 U | 7/2017 |
| DE | 10 2016 115 796 A1 | 3/2017 |
| EP | 3 135 832 A1 | 8/2016 |
| TW | 1567272 B | 1/2017 |
| WO | WO 20081137034 A1 | 11/2008 |

\* cited by examiner

FAUCETS PROVIDING WATER-AND-AIR FLOW

BACKGROUND OF THE INVENTION

This application is a Continuation-in-Part Application of application Ser. No 15/189,087, which was filed Jun. 22, 2016.

FIELD OF THE INVENTION

The present invention relates to faucets providing mixed water and air flow, including faucets having a faucet head and a magnetic-force-operated control to enable the mixing of water and air.

DESCRIPTION OF THE PRIOR ART

Control valves for faucets have various components, many of which are discrete parts that are assembled to ensure good water-tight seal and long-term durability or reliability. The manufacturing of faucets, however, can become complicated and expensive as the features, controls, and/or functions of faucets are revised over time.

For certain water faucet applications, one-touch valves were developed so a tap on an actuation element can control the water to flow through those valves. An example of one-touch valves is those supplied by the 3M Company for mounting externally to a faucet. A one-touch valve may simplify the operation of a faucet. However, these one-touch valves are add-on components for being placed at where water is discharged, i.e., directly at the outlet of a faucet. This also means that the valves are operated directly at the outlet where water flows through.

But adding a one-touch valve changes the overall design, dimension, and aesthetic appearance of a faucet, limiting the flexibility and/or attractiveness of the design or application. A post-sale-modification may raise reliability, durability, or repair issues. Further, operating a faucet outlet with hands, arms, or other bodily parts, which may have grease, bacteria, or other contaminants, adds grease, bacteria, or other contaminants to the faucet outlet itself, leading to hygiene or other concerns.

Conventional faucets contain handles to control water flow. When the faucet is operated in circumstances that require frequent on/off operations, having handles that are away from the location where water is discharged may cause inconvenience. Although placing a handle near the location where water is discharged may be a solution, it may limit design options. For example, if a faucet has a removable head that travels with a connecting hose, the location of the control may affect the mobility of the faucet head or hose, limit options for faucet design, or limit its portability.

SUMMARY OF THE INVENTION

According to a disclosed embodiment, there is provided a faucet. The faucet can include a faucet base, a water hose, a faucet head, a chamber, a water valve, and a control member.

The faucet base can include a first and second end. The faucet base can be adapted to be mounted to support the faucet near the first end and to regulate a water flow through the faucet.

The water hose can be coupled with the faucet base and extend through the first end and second end of the faucet base. The water hose can be adapted to be flexible and movable through an opening in the first end and through an opening in the second end of the faucet base.

The faucet head can be movably coupled to the second end of the faucet base. The faucet head can be adapted to be dismountable from the second end of the faucet base while being coupled to the water hose to direct a mixture of water-and-air flow to a location where the faucet head is directed to. The faucet head can be adapted to be relocated back to the second end of the faucet base to discharge the mixture of water-and-air flow while being coupled to the second end of the faucet base.

The chamber can be provided within the faucet head and have a first end and a second end. The first end of the chamber can be coupled with the water hose and can be coupled, in a dismountable manner, to the second end of the faucet base. The second end of the chamber can provide an outlet to discharge the mixture of water-and-air flow.

The water valve can be provided within the chamber and can be located between the first end and the second end of the chamber. The water valve can include at least one air inlet and a water inlet to enable mixing air from the at least one air inlet with water from the water inlet. The water inlet can be coupled with the water hose. The at least one air inlet can include an opening of the chamber or can be coupled with the chamber.

The water valve can further include a control valve movable between a first position and a second position within the water valve. The first position of the control valve can enable mixing the air from the at least one air inlet with the water from the water inlet to provide the mixture of water-and-air flow. The second position of the control valve can enable shut-off of the mixture of water-and-air flow. A direction of the control valve's movement between the first position and the second position can be substantially parallel to a direction of a water flow from the first end to the second end of the chamber. The control valve can be adapted to use a water pressure of water in the water hose to facilitate an operation of the control valve in at least one direction of the control valve's movement.

The control member can have a driving portion movably coupled with the faucet head. The control member can be adapted to operate, through a magnetic force, the control valve within the water valve. The magnetic force can cause the control valve's movement in a direction substantially parallel to the direction of a water flow from the first end of the chamber to the second end of the chamber. The magnetic force can be adapted to cause the control valve to move between the first position and the second position.

According to another disclosed embodiment, there is provided a faucet. The faucet can include a faucet base, a water hose, a faucet head, a water valve, and a control member.

The faucet base can include a first end and a second end.

The water hose can extend within the faucet base and can be movable through at least the second end of the faucet base.

The faucet head can have a first end, a second end, a chamber between the first and second end of the faucet head and coupled with the water hose, and an outlet coupled with the chamber at or near the second end of the faucet head to discharge a mixture of water-and-air flow. The first end of the faucet head can be adapted to be coupled to the second end of the faucet base, in a dismountable manner and while the faucet head remains coupled to the water hose, so that the faucet head is dismountable from the faucet base to change the direction of discharging the mixture of water-and-air flow.

The water valve can be provided within the chamber. The water valve can include one or more air inlets and a water inlet to enable mixing air from the one or more air inlets with water from the water inlet. The water inlet can be coupled with the water hose. The one or more air inlets can include one or more openings in the chamber or can be coupled with the chamber.

The water valve can further include a control valve movable within the water valve between a first position and a second position. The first position of the control valve can enable mixing air from the air inlet with water from the water inlet to provide the mixture of water-and-air flow. The second position of the control valve enable shut-off of the mixture of water-and-air flow. The control valve can be adapted to move between the first position and the second position in a direction substantially parallel to a direction of a water flow from the first end to the second end of the faucet head. The control valve can be adapted to use a water pressure of water in the water hose to facilitate an operation of the control valve.

The control member can be movably coupled with the faucet head from a side of the faucet head. The control member can be adapted magnetically to operate the control valve to move the control valve between the first position and the second position.

According to yet another disclosed embodiment, there is provided a faucet. The faucet can include a faucet base, a water hose, a faucet head, a chamber, a water valve, and a control member.

The faucet base can include a first end, a second end, and a water flow control coupled near the first end for regulating a water flow through the faucet. The first end of the faucet base can be adapted to be mounted to support the faucet.

The water hose can be accommodated between the first end and second end of the faucet base and can be movable through at least an opening near the second end of the faucet base.

The faucet head can be coupled to the water hose and, in a dismountable manner, to the second end of the faucet base while remaining coupled to the water hose.

The chamber can be provided within the faucet head. The chamber can have a first and second end. The first end of the chamber can be coupled with the water hose. The chamber can be adapted to discharge a mixture of water-and-air flow near the second end of the chamber.

The water valve can be provided within the chamber and can be located between the first and second end of the chamber. The water valve can include an air inlet and a water inlet to enable mixing air from the air inlet with water from the water inlet to provide the mixture of water-and-air flow. The water inlet can be coupled with the water hose. The air inlet can include an opening of the chamber or can be coupled with the chamber.

The water valve can further include a control valve movable within the water valve between a first position and a second position in a direction approximately parallel with a direction of a water flow from the first end to the second end of the chamber. The first position of the control valve can enable mixing air from the air inlet with water from the water inlet to provide the mixture of water-and-air flow. The second position of the control valve can enable shut-off of the mixture of water-and-air flow. An operation of the control valve can be facilitated by a water pressure of water in the water hose.

The control member can be movably coupled with the faucet head. The control member can include a driving portion having a knob being adapted for user operation in a direction approximately perpendicular to a side surface of the faucet head and a first magnet mechanically coupled to the knob.

The control member can further include a second magnet magnetically coupled with the first magnet when the knob is pressed. The second magnet can be adapted to engage with the control valve in a way to move the control valve from the second position to the first position of the control valve when the knob is pressed.

DETAILED DESCRIPTION OF THE PREFERRED EMBODIMENTS

Figure 1:
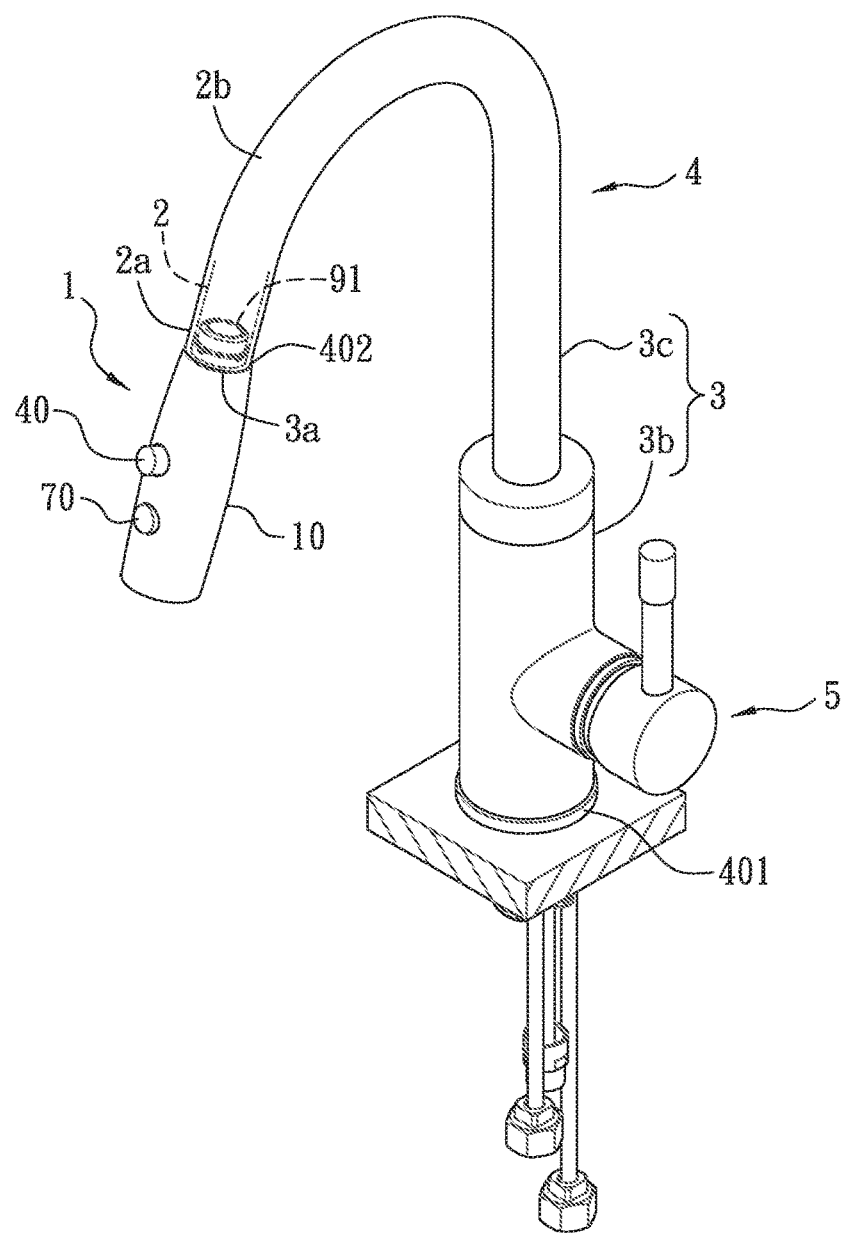
FIG. 1 is a perspective view illustrating an embodiment of a faucet consistent with the present invention.

Referring to FIG. 1, one embodiment of the present invention provides a faucet including a faucet base 4, a water hose 2, and a faucet head 1. Faucet base 4 can include a first end 401 and a second end 402. Water hose 2 can be coupled to faucet base 4 by extending through first end 401 and second end 402 of faucet base 4. Water hose 2 can be adapted to be flexible and movable through an opening of first end 401 and through an opening of second end 402 of faucet base 4. Faucet head 1 can be movably coupled to second end 402 of faucet base 4. Faucet head 1 can be adapted to be dismountable, and can be pulled away, for example, from faucet base 4 while remaining coupled to water hose 2 to direct water to a location away from faucet base 4. Faucet head 1 can be adapted to be relocated back to faucet base 4.

Faucet base 4 can be mounted to support the faucet near first end 401 and to regulate water flow through the faucet. Faucet base 4 can include a water flow control 5 coupled with water hose 2 and located near first end 401 of faucet base 4 to control an amount of water flowing through water hose 2 and to vary a mix of cold water and hot water going into water hose 2. For example, water flow control 5 can be mounted near a lower portion of faucet base 4 near a side opening of faucet base 4. Water flow control 5 can be coupled with water hose 2, a cold water intake, and a hot water intake to vary, when a water flow is enabled, a mix of cold water and hot water going into water hose 2.

Figure 2:
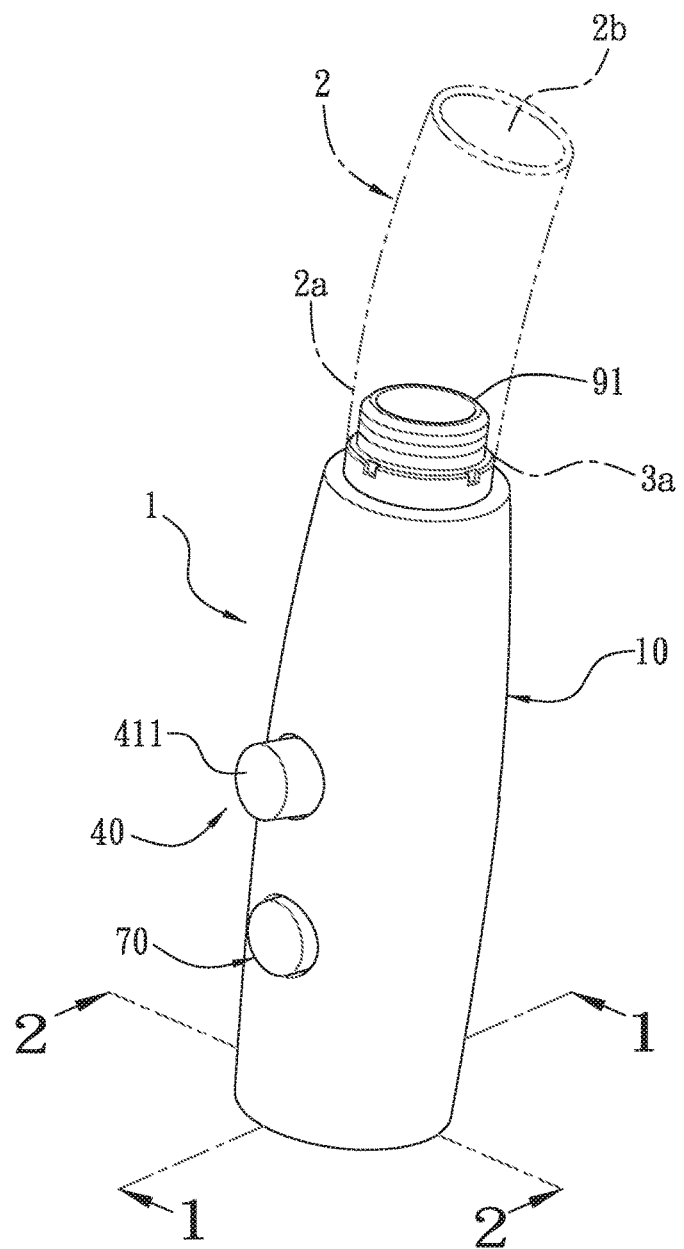
FIG. 2 is a perspective view illustrating an embodiment of a faucet head consistent with the present invention, with dotted line illustrating a water hose.

Referring to FIGS. 1 and 2, a faucet head 1 can be mounted on a pull-out faucet base 4 or a pull-down faucet base 4, which can include a body portion 3 and, for example, can be mounted in a kitchen or a bathroom, such as over or near a sink. Faucet head 1 can be coupled with a water supply segment 2a of water hose 2, and water hose 2 can be movably accommodated within and slidable through faucet base 4. Water hose 2 can include a water conduit 2b defined therein. Faucet head 1 and water hose 2 can be pulled out and retracted back to an outlet 3a at second end 402 of faucet base 4. Body portion 3 of faucet base 4 can include a base holder 3b and a tubular extension 3c extending from holder 3b and, in some embodiments, bend forward and downward as illustrated in FIG. 1. The amount of the bend, illustrated like a swan neck in FIG. 1, may depend on aesthetic designs, faucet applications, cost/manufacturing considerations, and/or other factors. Water hose 2 can extend through holder 3b and tubular extension 3c.

Figure 3:
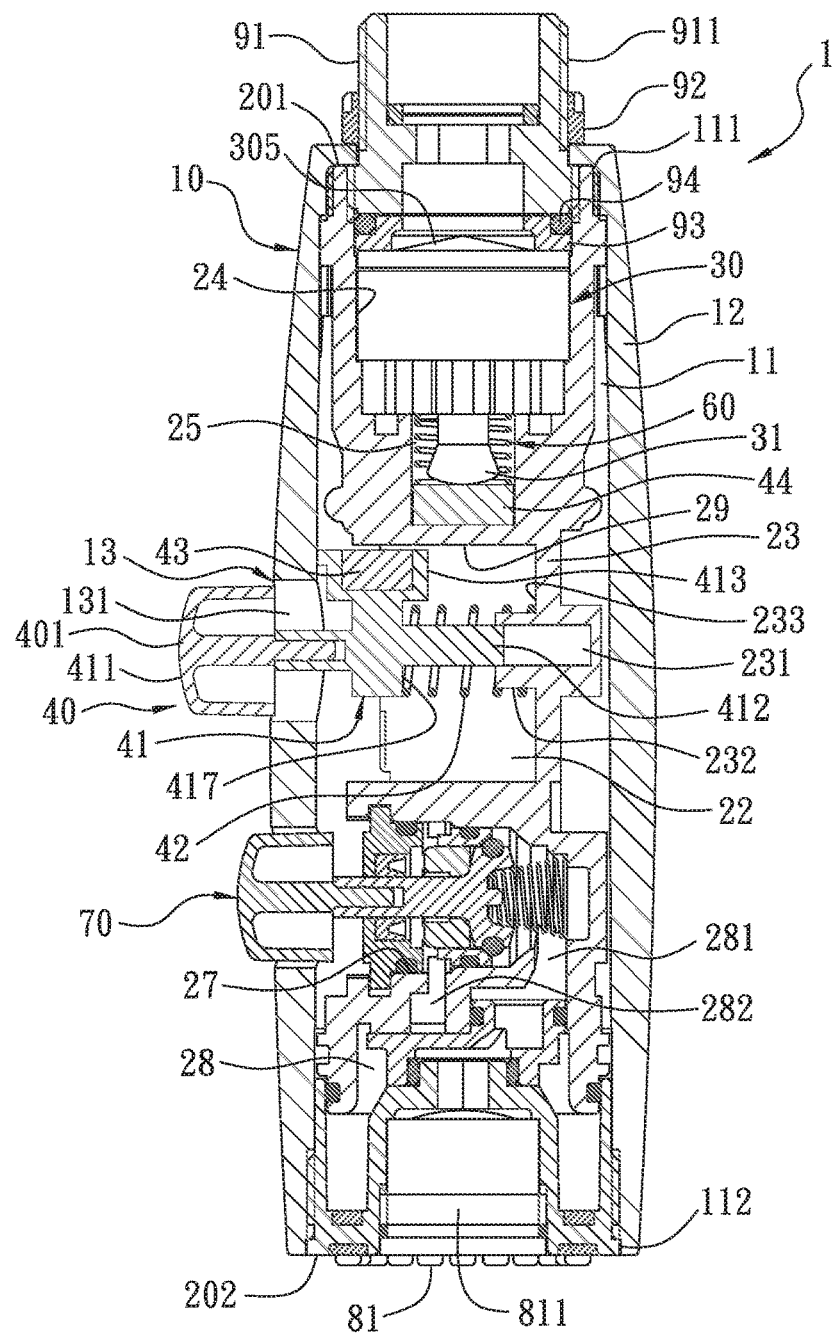
FIG. 3 is a cross-sectional view of an embodiment of a faucet head, taken along line 1-1 of FIG. 2.
Figure 4:
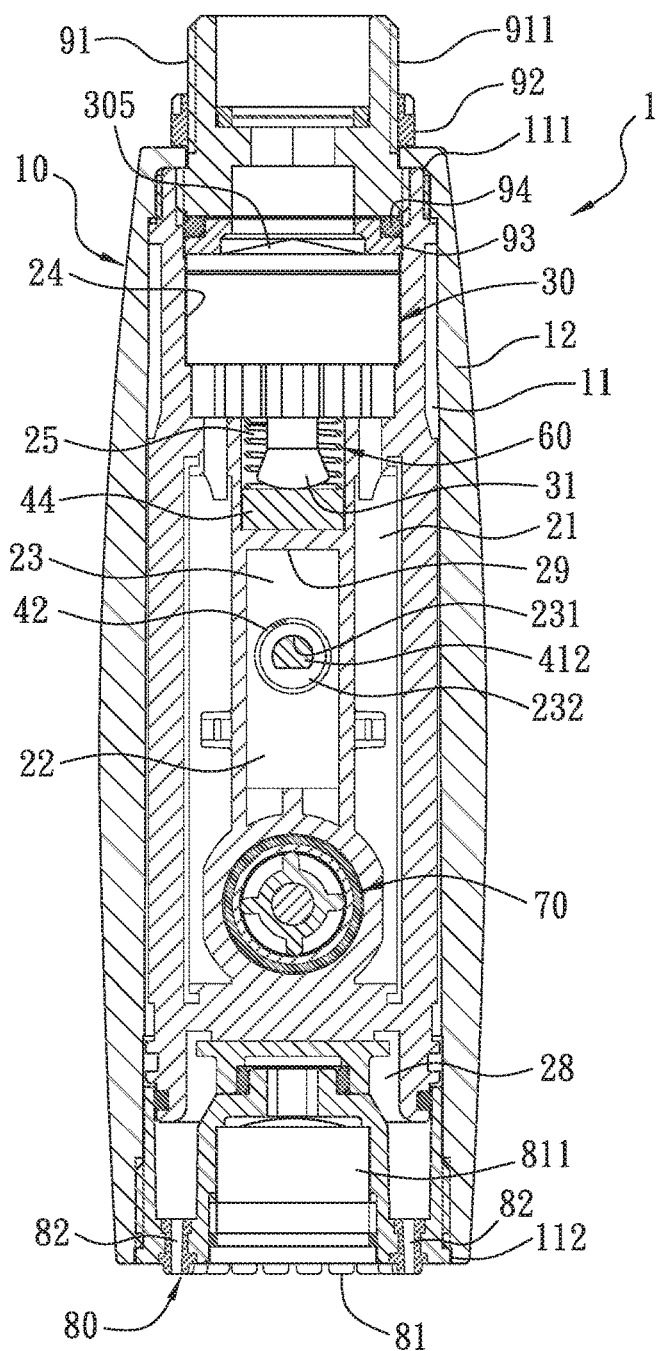
FIG. 4 is a cross-sectional view of an embodiment of a faucet head, taken along line 2-2 of FIG. 2.
Figure 5:
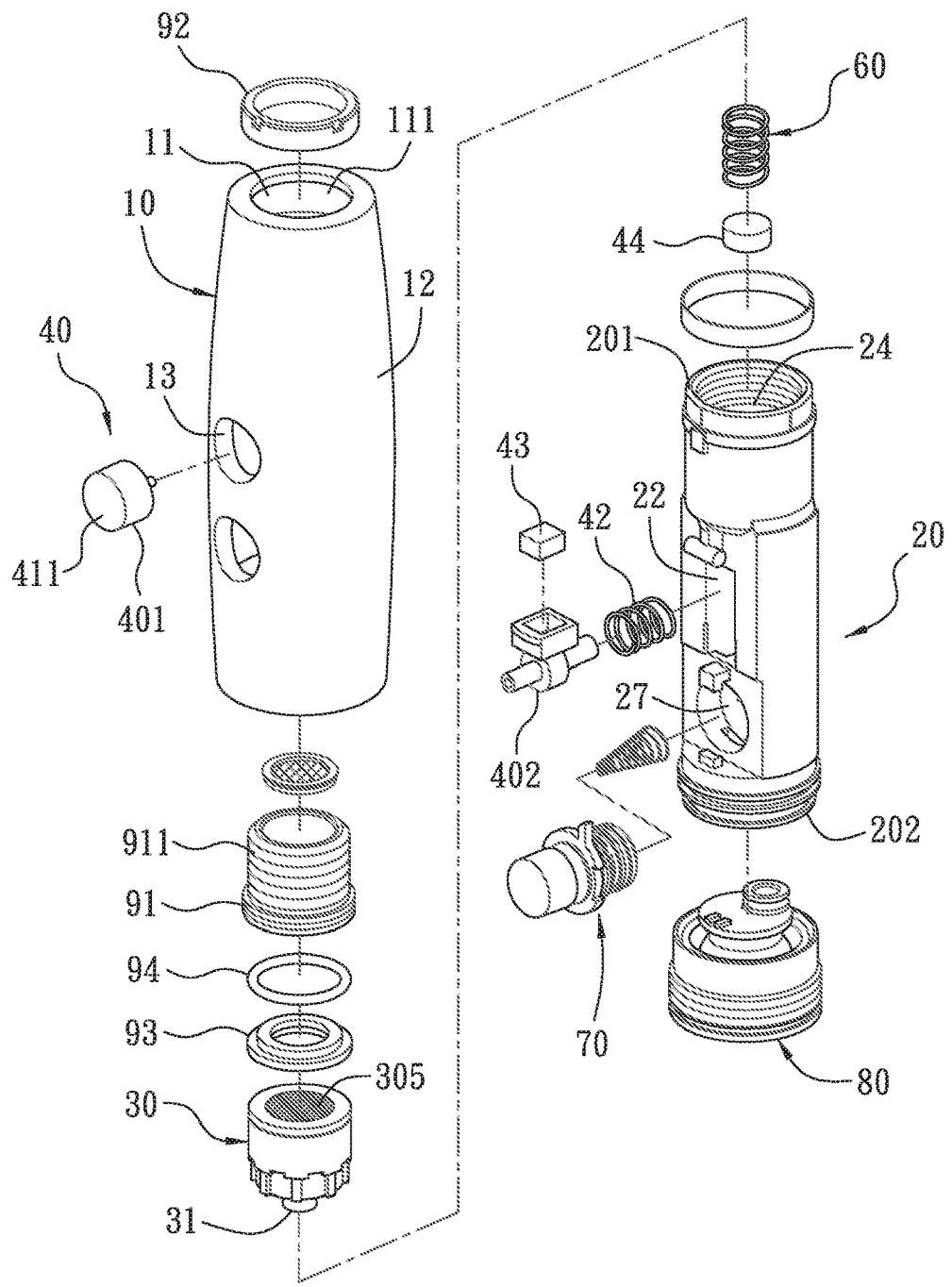
FIG. 5 is an exploded-view diagram illustrating an embodiment of a faucet head consistent with the present invention.

Referring to FIGS. 3-5, faucet head 1 can include an outer casing 10, a chamber 11, a water valve 30, and a control member 40. In some embodiments, chamber 11 may be an opening provided within faucet head 1 (or within outer casing 10), and faucet head 1 may provide chamber 11 therein, such as through a uni-body construction or a multiple-part construction. With a uni-body or integrated construction, a substantially-cylindrical space (cylinder) 20 within outer casing 10 may serve as a portion of chamber 11. Outer casing 10 can be manually operated by user, such as for holding and/or pulling faucet head 1, and can include chamber 11. Chamber 11 can be configured to be within faucet head 1 and include a first end 111 and a second end 112. First end 111 of chamber 11 can provide a water inlet coupled with water hose 2, and second end 112 of chamber 11 can provide a water and air outlet to discharge a mixture of water-and-air flow near second end 112 of chamber 11. First end 111 of chamber 11 can be coupled, in a dismountable manner, to second end 402 of faucet base 4.

For example, faucet head 1 can be dismountable from second end 402 of faucet base 4 while remaining coupled to water hose 2 to direct a mixture of water-and-air flow to a location away from faucet base 4 and to be relocated back to second end 402 of faucet base 4 to discharge the mixture of water-and-air flow while being coupled to faucet base 4.

Figure 6:
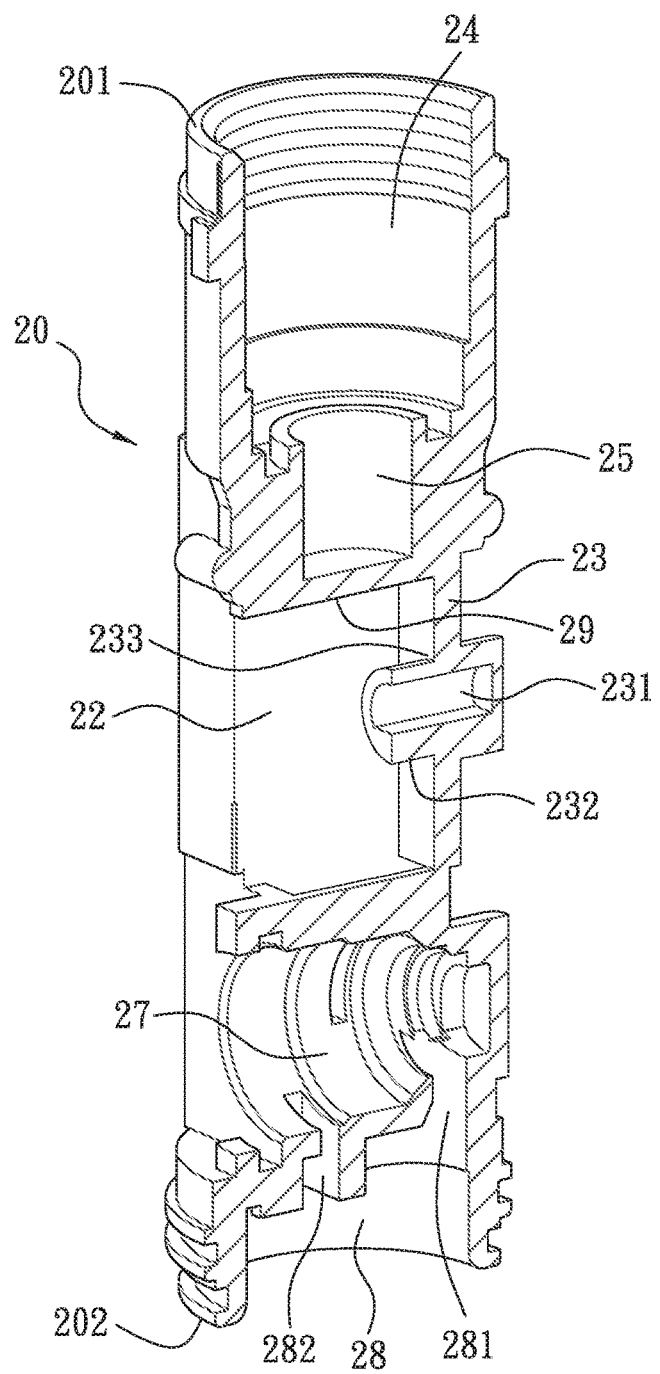
FIG. 6 is a perspective-section diagram illustrating an embodiment of a portion of a chamber in a faucet head consistent with the present invention.
Figure 7:
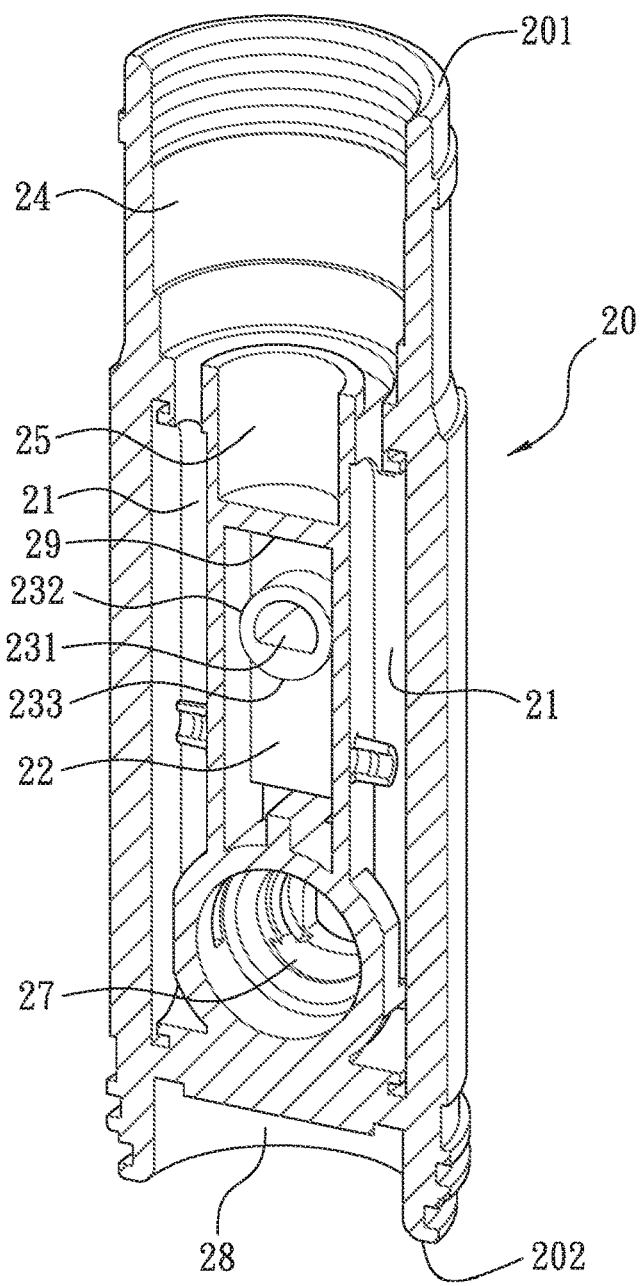
FIG. 7 is another perspective-section diagram illustrating an embodiment of a portion of a chamber in a faucet head consistent with the present invention.

Referring to FIGS. 3-7, cylinder 20 can be housed in chamber 11 of outer casing 10 and can include an inlet segment 201 communicating with water conduit 2b of water hose 2 via an inflow connector 91 (see FIGS. 1 and 2), an outlet segment 202, at least one first orifice 21, a second orifice 22, a cavity 25 adjacent inlet segment 201, and a wall 23 adjacent second orifice 22. As shown in FIGS. 6-7, first orifice 21, second orifice 22, cavity 25, and wall 23 can be defined between inlet segment 201 and outlet segment 202.

Figure 11:
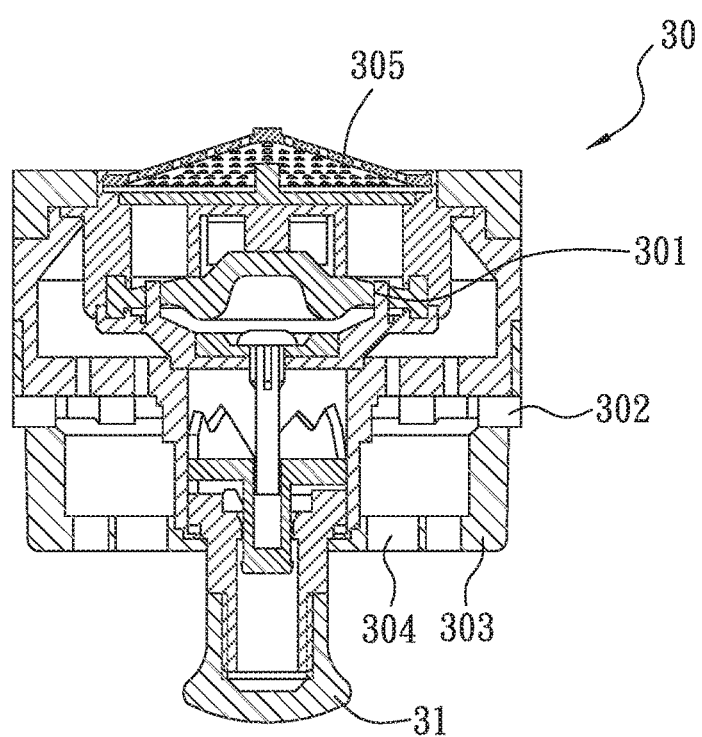
FIG. 11 is a cross-sectional view illustrating an embodiment of a water valve consistent with the present invention.

Water valve 30 can be positioned within chamber 11 and located between first end 111 and second end 112 of chamber 11. Water valve 30 can be accommodated in cylinder 20. Referring to FIG. 11, water valve 30 can include one or more air inlets 302 and a water inlet 305 to enable mixing air from air inlets 302 with water from water inlet 305. Air inlets 302 of water valve 30 can be coupled with chamber 11. Water inlet 305 can be coupled with water hose 2. Chamber 11 can include at least one air inlet at or near a side of faucet head 1 or second end 112 of chamber 11. The at least one air inlet of chamber 11 can be in communication with air inlets 302 of water valve 30 to enable the water valve's mixing of water and air. For example, an opening on faucet head 1 (or outer case 10) in communication with chamber 11 can serve as the air inlet of chamber 11 to supply air to water valve 30. An opening 13 of outer casing 10, as shown in FIG. 3 and will be described further below, can be adapted to communicate with and allow air intake to air inlets 302 of water valve 30. A side opening of faucet head 1 for accommodating a switch valve 70, as shown in FIG. 3 and will be described further below, can also be adapted to communicate with and allow air intake to air inlets 302 of water valve 30.

Alternatively or additionally, a center outlet 81 and/or a plurality of peripheral outlets 82, as shown in FIG. 4, can serve as an air inlet of chamber 11 to supply air to water valve 30. As will be described further below, center outlet 81 and peripheral outlets 82 can be adapted to communicate with chamber 11 to discharge a flow of the water-and-air mixture in a stream discharge mode and a spray discharge mode, respectively. When in the stream discharge mode, one or more peripheral outlets 82 can be adapted to communicate with and allow air intake to air inlets 302 of water valve 30. When in the spray discharge mode, center outlet 81 can be adapted to communicate with and allow air intake to air inlets 302 of water valve 30.

Water valve 30 can include a control valve 301 that is movable within water valve 30 between a first position and a second position. The first position can be a position that enables mixing air from air inlets 302 with water from water inlet 305 to provide a mixture of water-and-air flow. The second position can be a position that enables shut-off of a mixture of water-and-air flow. A direction of the movement of control valve 301 between the first position and the second position can be substantially parallel with a direction of a water flow (or a water-and-air flow) from first end 111 to second end 112 of chamber 11. Control valve 301 can be adapted to use a water pressure supplied by water hose 2 to facilitate an operation of control valve 301, either in one direction or in both directions.

Water valve 30 can be a water-pressure-assisted aerator with a control valve. In one embodiment and referring to FIG. 11, water valve 30 can contain a screen 303 coupled with control valve 301 and located downstream of control valve 301. Screen 303 can include a plurality of water passageways 304, with as little as two or four passageways to as many as a dozen or dozens of passageways. Water passageways 304 can be in communication with one or more air inlets 302 of water valve 30 to enable the water valve's mixing of water and air into a mixture of water-and-air flow. Air inlets 302 may have openings from the side, from the above, from the lower portion of water valve 30, or having the openings in any of the combinations. The air inlets may enable the faucet head and the chamber to be designed with flexibilities and with openings or gaps to enable air flow.

Referring to FIGS. 3-5 and 11, control valve 301 can include a driving member 31 that protrudes out from one end of water valve 30, such as from a lower portion or the bottom of water valve 30. Driving member 31 can be engaged with and driven by control member 40 to control a position of control valve 301. For example, driving member 31 can be driven to move control valve 301, such as moving it up, to turn on water valve 30 so that water flows into at least one first orifice 21 of cylinder 20 from water conduit 2b of water hose 2 and into water inlet 305 of water valve 30. When control valve 301 is pushed up, it breaks the water-tight seal between control valve 301 and a lateral or internal wall of water valve 30 to cause the water from the connected water hose 2, through water conduit 2b, to flow through water inlet 305. Water inlet 305 may be equipped with a screen, a mesh, or some other debris- or particle-blocking design to avoid any debris or particle from entering the water-tight seal of control valve 301, which may cause it to lead or malfunction. When control valve 301 is lowered, it returns to its water-tight seal state, and the control valve 301 may be designed with surface(s) onto which water pressure may exert additional force to reinforce the water-tight seal between control valve 301 and an internal wall of water valve 30. The seal between control valve 301 and water valve 30 may be formed with rubber, resin, or other suitable sealing materials.

In one embodiment, the control valve may be coupled or equipped with a spring and a cam that moves or locks control valve in two or more different positions each time the driving member 31 is pressed. The design or operation may be similar to or a variation of those used in retractable/clicking pens. U.S. Pat. No. 3,819,282 discloses one example of such design. In one embodiment of control valve 301, a second/resting position can provide a water-tight seal and stop water flow. A first position can open the seal between control valve 301 and internal wall(s) of water valve 30, and the opening enables the water flow. A third position or additional positions are optional, and when used, it/they may keep the seal open, but modulate the water flow by providing a bigger (or smaller) gap(s) to provide more (or less) water flow than the water flow at the first position.

Driving member 31 can include a pin, rod, stem, tube, or an elongated structure protruding out of water valve 30. Driving member 31 can include a head for coupling with control member 40 and a body connected to the head for transmitting force and/or motion.

Figure 8:
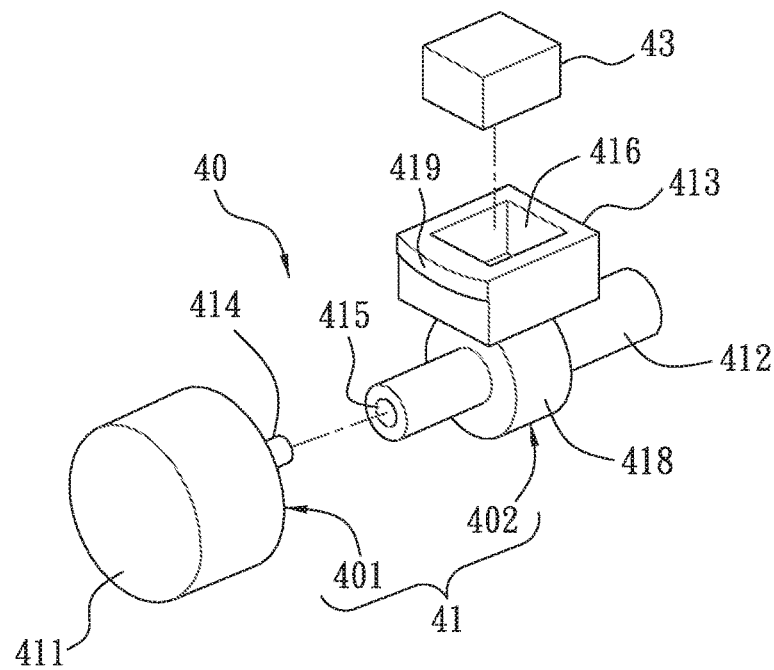
FIG. 8 is a perspective view illustrating an embodiment of certain parts of a control member consistent with the present invention.
Figure 9:
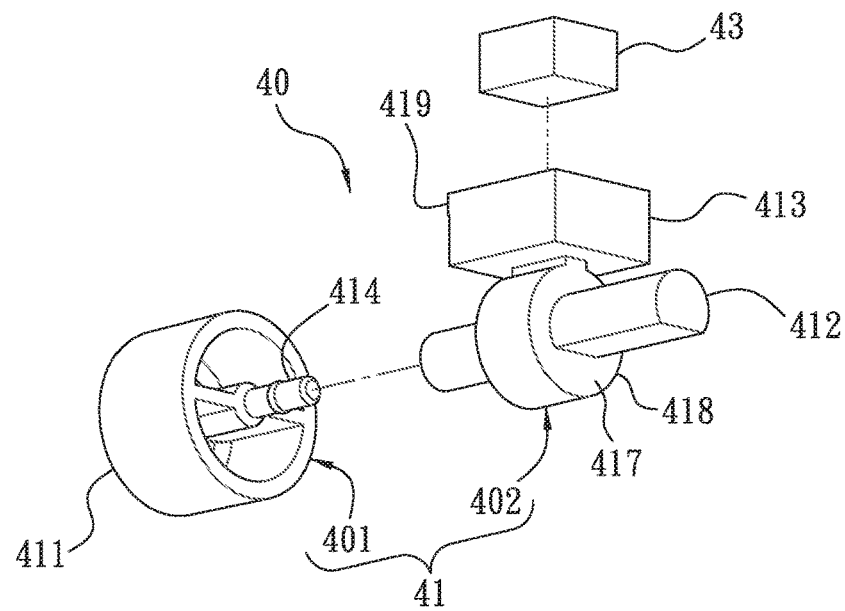
FIG. 9 is another perspective view illustrating an embodiment of certain parts of a control member consistent with the present invention.
Figure 10:
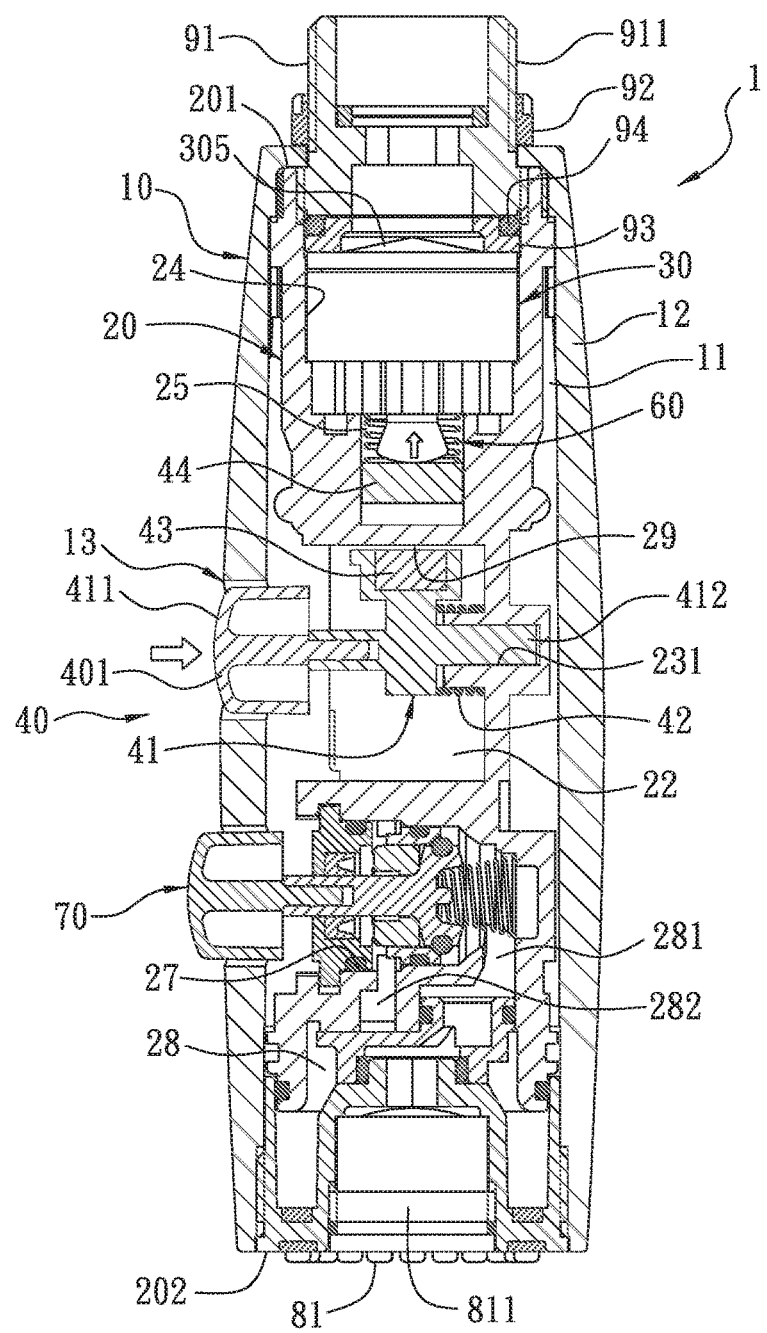
FIG. 10 is a cross-sectional view illustrating an embodiment of a faucet head consistent with the present invention.

As illustrated in FIGS. 3-10, control member 40, or more specifically, a driving portion 41 of control member 40, can be movably coupled with faucet head 1 at or near a side of faucet head 1 (or outer casing 10), to enable an operation of control valve 301 within water valve 30. The operation may occur by pressing driving portion 41 from or near a side of faucet head 1 to cause, through a magnetic force, control valve 301 to move between the first position and the second position. For example, driving portion 41 can be moved between a first position and a second position, such as by moving from a second position of driving portion 41 as shown in FIG. 3 to a first position of driving portion 41 as shown in FIG. 10. Control member 40 can be adapted to enable, through a magnetic force, an operation of control valve 301 within water valve 30. The magnetic force can trigger the operation of control valve 301 in a direction substantially parallel to the direction of a water flow from first end 111 of chamber 11 to second end 112 of chamber 11. The magnetic force can be adapted to cause control valve 301 to move between the first position and the second position.

Control member 40 can include a driving portion 41 including a knob 401 and a first magnet 43 mechanically coupled to knob 401. Control member 40 can further include a second magnet 44 positioned within cavity 25 of cylinder 20. Knob 401 can include a press section 411 and an extension 414 protruding from one side of press section 411. Carrier 402 can include a shaft 412 coupled to knob 401 and first magnet 43. Shaft 412 can include a recess 415 at one end for engaging with extension 414 of knob 401. The engagement of recess 415 with extension 414 can form a tight fit or any other connection preventing relative movement between knob 401 and shaft 412.

First magnet 43 can be coupled to shaft 412 through a mounting portion 413. Mounting portion 413 can be fixed coupled to shaft 412 and can include a recess 416 for receiving or mounting first magnet 43. As shown in FIG. 8, first magnet 43 can have a cubic shape and recess 416 can have a corresponding cubic space for accommodating first magnet 43. First magnet 43 can have at least one magnetic pole exposed. Mounting portion 413 can be coupled to shaft 412 through a flange 418 that is positioned between two ends of shaft 412.

Driving portion 41 can be positioned within second orifice 22 of cylinder 20 with press section 411 of knob 401 being operatively exposed through opening 13 of outer casing 10. Driving portion 41 can be slidably coupled to cylinder 20 such that shaft 412, with first magnet 43 coupled thereto, can be moved or translated within second orifice 22 in a direction substantially perpendicular with the direction of the water flow from first end 111 of chamber 11 to second end 112 of chamber 11. For example, one end of shaft 412 can be inserted into and movable within a guiding slot 231 in wall 23 of cylinder 20. Guiding slot 231 can be part of a protrusion 232 extending towards second orifice 22 from wall 23. The end of shaft 412 inserted into guiding slot 231 can have a non-circular cross-sectional shape, and guiding slot 231 can have a corresponding non-circular cross section. FIGS. 7 and 9 show that shaft 412 has a D-shaped section engageable with a D-shaped guiding slot 231. The non-circular design of the shaft and guiding slot can limit the movement of driving portion 41 to a translation, and can prevent driving portion 41 from unwanted rotation about guiding slot 231, for example. Other rigid structures such as a non-circular beam can be used instead of a shaft to prevent rotation of driving portion 41.

Knob 401, shaft 412, and guiding slot 231 can be coaxially arranged. However, a coaxial arrangement is not necessary for an operation of driving portion 41. For example, a center line of knob 401 can be offset from a center line of guiding slot 231 such that knob 401 is non-axially coupled to guiding slot 231. In this example, a shaft or other rigid structure operatively connecting knob 401 to guiding slot 231 can be used.

A resilient element 42 such as a spring can be mounted over protrusion 232 such that it is coupled to a fringe 233 of flange 418 at one end and coupled to wall 23 at the other end. Resilient element 42 can be a compressive spring adapted to be biased against an operation of knob 401.

Second magnet 44 can be movably positioned within cavity 25 of cylinder 20. Sufficient space in cavity 25 can be provided to allow operations of both driving member 31 of water valve 30 and second magnet 44. Second magnet 44 can be mechanically coupled to control valve 301. Second magnet 44 can be positioned below driving member 31 such that it can contact with driving member 31 in at least one position within cavity 25. A shown in FIG. 3, second magnet 44 can be moved to a bottom of cavity 25 and stopped by a limiter 29. Limiter 29 can be part of an inner wall of cylinder to restrict a movement of second magnet 44, and it can seal off cavity 25. Limiter 29 can be non-magnetic to ensure proper function of control member 40. In this position, driving member 31 is not driven to cause control valve 301 to enable a water flow, and second magnet 44 may or may not be in contact with driving member 31. As shown in FIG. 9, second magnet 44 can be moved away from limiter 29 to make contact with and urge against driving member 31 to cause control valve 301 to enable a water flow.

With the arrangements disclosed herein, driving portion 41 can be moved as a whole such that an operation of knob 401 causes a movement of first magnet 43. For example, when knob 401 is moved from a second position as shown in FIG. 3 to a first position as shown in FIG. 10 in a direction substantially perpendicular with the direction of the water flow from first end 111 to second end 112 of chamber 11, first magnet 43 is moved from a position away from second magnet 44 to a position near or close to second magnet 44. When knob 401 is in its second position as shown in FIG. 3, first magnet 43 is in a position offset from second magnet 44 and not interacting with second magnet 44 to cause a movement of second magnet 44. When knob 401 is operated to be moved to its first position as shown in FIG. 9, first magnet 43 is moved to a position in which it magnetically interacts with second magnet 44 to cause a movement of second magnet 44. First magnet 43 can be moved underneath limiter 29 such that there is sufficient magnetic interaction between first magnet 43 and second magnet 44 to cause a movement of second magnet 44. A repulsive force can be generated from the magnetic interaction between first and second magnets 43, 44 to move control valve 301 toward its first position. A sufficient repulsive force may be needed to overcome at least the weight of second magnet 44, the weight of driving member 31, the weight of control valve 301, and/or an elastic force of compression spring 60. In addition, it would be desirable that opposite poles of first and second magnets 43, 44 are aligned to obtain a preferable magnitude of the repulsive force.

As explained, the movement of second magnet 44 can bring second magnet 44 into contact with and drive driving member 31, which in turn drives an operation of control valve 301. As a result, first magnet 43 can magnetically interact with second magnet 44 to move control valve 301 between its first and second positions when knob 401 is operated between its first and second positions.

Control member 40 can be operated to cause control valve 301 to move from its second position to its first position, and control valve 301 can remain in the first position until control member 40 is further operated to cause control valve 301 to move from the first position to the second position. That is, control valve 301 can be configured to remain in the first position after driving portion 41 is pressed and released. For example, driving portion 41 can be released after being pressed to cause control valve 301 to move to and remain in the first position until driving portion 41 is operated again, such as by pressing, to cause control valve 301 to move from the first position to the second position.

It is noted that an operation of driving portion 41 can be adapted to be in a direction substantially perpendicular to a side surface of faucet head 1. Press section 411 of knob 401 can be pressed by a user to move first magnet 43 in that direction to a position in which first magnet 43 is magnetically engaged with second magnet 44, and, as discussed above, a repulsive force can be generated to drive second magnet 44 to move towards first end 111 of chamber 11 to cause control valve 301 to move from its second position to its first position. When press section 411 is pressed again, second magnet 44 can be adapted to engage with control valve 301 to restore control valve 301 from its first position to its second position.

Referring to FIGS. 3-7, chamber 11 can include, in cylinder 20, for example, a cavity 24 located in inlet segment 201, cavity 25 formed at a bottom of cavity 24, and through hole 26 in spatial communication with cavity 25. At least one first orifice 21 can communicate with cavity 24 and the outlet segment 202. Water valve 30 can be housed in cavity 24, and driving member 31 and second magnet 44 can be accommodated in cavity 25.

Outer casing 10 can include a wall 12 configured to define chamber 11. Outer casing 10 can include an opening 13 defined in wall 12 corresponding to control member 40 so that driving portion 41 can be pressed into and/or through opening 13 when pressing section 411 is pressed, as shown in FIGS. 3 and 10. Preferably, a size of opening 13 is larger than that of pressing section 411 of driving portion 41 so that pressing section 411 can be accommodated in opening 13 while exposing a pressing surface of pressing section 411.

Referring to FIGS. 3-5 and 10, faucet head 1 can further include a compression spring 60 in cavity 25. Compression spring 60 can be accommodated between water valve 30 and second magnet 44 to urge against second magnet 44 towards limiter 29 to facilitate second magnet 44 to return to its original position. By urging second magnet 44 back to its original position, compression spring 60, together with resilient element 42 biasing against driving portion 41, can facilitate the return of driving portion 41 back to its previous position after driving portion 41 is released. One or more of compression spring 60 and resilient element 42 may improve user experience due to the presence of the biasing force that is in the form of feedback experienced by the user.

An on-off indicator can be formed on pressing section 411 to indicate whether driving portion 41 (or generally to a user, control member 40) is pressed or released. For example, the indicator can indicate an "on" status when driving portion 41 is pressed into opening 13 and an "off" status when driving portion 41 is not operated or is released after pressing. Alternatively or additionally, the indicator can indicate the "on" and/or "off" status using symbols, illumination, or other means.

Chamber 11 can provide a housing near second end 112 of chamber 11 to enclose a switch valve 70 guiding a flow of the water-and-air mixture between a stream discharge and a spray discharge. Switch valve 70 can be operated via a switch movably mounted on a side opening of faucet head 1.

For example, faucet head 1 can include switch valve 70 near second end 112 of chamber 11 to switch a flow of the water-and-air mixture between a stream discharge and a spray discharge. For example, switch valve 70 can be arranged on cylinder 20 and configured to switch a water flow between a stream discharge mode and a spray discharge mode. Faucet head 1 can include a water outlet 80, as shown in FIGS. 3 and 4. Switch valve 70 can be operated, such as by pressing, to cause the water to be guided through a center outlet 81 or a plurality of peripheral outlets 82 of water outlet 80 from the at least one first orifice 21 to produce at least two water discharge modes, such as a stream discharge mode and a spray discharge mode.

With reference to FIGS. 6 and 7, cylinder 20 can include a cavity 27 communicating with the at least one first orifice 21 to accommodate switch valve 70. Cylinder 20 can further include a recess 28 for accommodating water outlet 80. Recess 28 can include a central channel 281 and a peripheral channel 282 communicating with cavity 27.

Second end 112 of chamber 11 can provide a stream discharge of a water-and-air mixture through center outlet 81 of water outlet 80 and a spray discharge of a mixture of water and air through the plurality of peripheral outlets 82 of water outlet 80. Center outlet 81 can be in communication with and discharge water from central channel 281. The plurality of peripheral outlets 82 can be in communication with and discharge water from peripheral channel 282. Center outlet 81 can include a foam generator 811 to produce foamy water.

Cylinder 20 can be adapted to match with a water outlet so as to discharge water from the at least one first orifice 21 in a particular discharge mode.

Referring to FIGS. 3-5, faucet head 1 can further include an inflow connector 91 engaged at a top of cavity 24. Inflow connector 91 can include a threaded portion 911 extending from outer casing 10, a nut 92 engaging with threaded portion 911 of inflow connector 91 and locking inflow connector 91 and cylinder 20 to the top of outer casing 10, a padding 93 located between inflow connector 91 and a top of water valve 30 to limit water valve 30 in cavity 24, and a second seal washer 94 fitted on padding 93 and contacting with cavity 24.

When control valve 301 of water valve 30 is configured to operate automatically, driving member 31 can be driven to move control valve 301 to a position enabling water discharge. Thereafter, control valve 301 can move back to an original position to stop discharging water.

When control valve 301 is not configured to be automatic, control member 40 can be manually operated by the user to close control valve 301. Control member 40 can be operated to drive driving member 31 of water valve 30 to move control valve 301 to a position enabling shut-off of water.

Thus, water valve 30 can be driven by control member 40 so as to avoid touching and contaminating water valve 30. Control member 40 can be slidably connected with cylinder 20 to simplify faucet head 1 and reduce fabrication cost.

Water valve 30 can be a pre-assembled assembly with a control valve, such as control valve 301, inside the water valve and with a driving member, such as driving member 31, protruding through one end of the water valve and coupled with the control valve to cause the control valve to move between a first and a second position, such as between the first and second position described above.

Faucet head 1 can be further adapted to discharge water in different discharge modes using means other than switch valve 70.

While the preferred embodiments of the invention have been set forth for the purpose of disclosure, modifications of the disclosed embodiments of the invention as well as other embodiments thereof may occur to skilled in the art. Accordingly, the appended claims are intended to cover all embodiments which do not depart from the spirit and scope of the invention.

What is claimed is:
1. A faucet comprising:
a faucet base having a first and second end, the faucet base being mounted to support the faucet near the first end and to regulate a water flow through the faucet;
a water hose coupled with the faucet base and extending through the first end and second end of the faucet base, the water hose being flexible and movable through an opening in the first end and through an opening in the second end of the faucet base;
a faucet head movably coupled to the second end of the faucet base, the faucet head being dismountable from the second end of the faucet base while coupled to the water hose to direct a mixture of water-and-air flow to a location where the faucet head is directed to, and the faucet head being relocated back to the second end the faucet base to discharge the mixture of water-and-air flow while being coupled to the second end of the faucet base;
a chamber within the faucet head having a first end and a second end, the first end of the chamber being coupled with the water hose and being coupled, in a dismountable manner, to the second end of the faucet base, the second end of the chamber providing an outlet to discharge the mixture of water-and-air flow;
a water valve within the chamber and located between the first end and the second end of the chamber, the water valve comprising:
at least one air inlet and a water inlet to enable mixing air from the at least one air inlet with water from the water inlet, the water inlet being coupled with the water hose, the at least one air inlet being an opening of the chamber or being coupled with the chamber, and
a control valve movable between a first position and a second position within the water valve, the first position enabling mixing the air from the at least one air inlet with the water from the water inlet to provide the mixture of water-and-air flow, and the second position enabling shut-off of the mixture of water-and-air flow, a direction of the control valve's movement between the first position and the second position being parallel to a direction of a water flow from the first end to the second end of the chamber, the control valve being configured to use a water pressure of water in the water hose to facilitate an operation of the control valve in at least one direction of the control valve's movement; and
a control member having a driving portion movably coupled with the faucet head, the control member being configured to actuate the control valve within the water valve to move in a direction parallel to the direction of a water flow from the first end of the chamber to the second end of the chamber, and the control valve is actuated by the control member to move between the first position and the second position;
wherein the control member is operated to cause the control valve to move from the second position to the first position of the control valve, and the control valve remains in the first position until the control member is further operated to cause the control valve to move from the first position to the second position of the control valve;
wherein the control member comprises a knob, a first magnet, and a second magnet, the knob being operable between a second position and a first position in a direction-perpendicular with the direction of the water flow from the first end of the chamber to the second end of the chamber, the first magnet being mechanically coupled to the knob, the second magnet being mechanically coupled to the control valve, and the first magnet magnetically interacting with the second magnet to move the control valve between the first and second positions of the control valve when the knob is operated between its first and second positions;
wherein when the knob moves from the second position to the first position of the knob, the knob pushes the first magnet toward the second magnet so that a repulsive force between the first and second magnets cause the control valve to move toward the first position of the control valve; and
wherein the faucet head comprises a first spring and a second spring, the first spring having one end coupled to the chamber and the other end coupled to the knob and configured to exert a first spring-loaded force on the knob in a direction perpendicular to the direction of the water flow from the first end of the chamber to the second end of the chamber, the second spring having one end coupled to the control valve and the other end coupled to the second magnet and configured to exert a second spring-loaded force on the second magnet in a direction-parallel to the direction of a water flow from the first end of the chamber to the second end of the chamber.

2. A faucet comprising:

a faucet base having a first end and a second end;

a water hose extending within the faucet base and being movable through at least the second end of the faucet base;

a faucet head having a first end, a second end, a chamber between the first and second end of the faucet head and coupled with the water hose, and an outlet coupled with the chamber at or near the second end of the faucet head to discharge a mixture of water-and-air flow, the first end of the faucet head being coupled to the second end of the faucet base, in a dismountable manner and while the faucet head remains coupled to the water hose, so that the faucet head is dismountable from the faucet base to change the direction of discharging the mixture of water-and-air flow;

a water valve within the chamber, the water valve comprising:

one or more air inlets and a water inlet to enable mixing air from the one or more air inlets with water from the water inlet, the water inlet coupled with the water hose, the one or more air inlets being one or more openings in the chamber or coupled with the chamber, and a control valve movable within the water valve between a first position and a second position, the first position enabling mixing air from the air inlet with water from the water inlet to provide the mixture of water-and-air flow, and the second position enabling shut-off of the mixture of water-and-air flow, the control valve being configured to move between the first position and the second position in a direction parallel to a direction of a water flow from the first end to the second end of the faucet head, the control valve being configured to use a water pressure of water in the water hose to facilitate an operation of the control valve; and a control member movably coupled with the faucet head from a side of the faucet head, the control member being configured magnetically to operate the control valve to move the control valve between the first position and the second position;

wherein the control member comprises a knob, a first magnet, and a second magnet, the knob being configured to move from a second position to a first position in a direction perpendicular with the direction of the water flow, the first magnet being physically coupled to the knob, the second magnet being physically coupled to the control valve, the first magnet magnetically interacting with the second magnet to move the control valve towards the first position of control valve when the knob is operated to move towards the first position of the knob.

3. The faucet of claim 2, wherein the first magnet and the second magnet magnetically interact to result in a repulsive force driving the second magnet to move in a direction opposite to a direction of the water flow from the first end to the second end of the faucet head to cause the movement of the control valve when the knob is pressed.

4. The faucet of claim 2, wherein the control valve comprises a driving member protruding from the water valve, the driving member being coupled with the second magnet to cause the movement of the control valve.

5. A faucet comprising:

a faucet base having a first end, second end, and a water flow control coupled near the first end for regulating a water flow through the faucet, the first end of the faucet base being mounted to support the faucet;

a water hose being accommodated between the first end and second end of the faucet base and movable through at least an opening near the second end of the faucet base;

a faucet head coupled to the water hose and, in a dismountable manner, to the second end of the faucet base while remaining coupled to the water hose;

a chamber within the faucet head, the chamber having a first and second end, the first end of the chamber being coupled with the water hose, the chamber being configured to discharge a mixture of water-and-air flow near the second end of the chamber;

a water valve within the chamber and located between the first and second end of the chamber, the water valve comprising:

an air inlet and a water inlet to enable mixing air from the air inlet with water from the water inlet to provide the mixture of water-and-air flow, the water inlet being coupled with the water hose, the air inlet being an opening of the chamber or being coupled with the chamber, and a control valve movable within the water valve between a first position and a second position in a direction parallel with a direction of a water flow from the first end to the second end of the chamber, the first position enabling mixing air from the air inlet with water from the water inlet to provide the mixture of water-and-air flow, the second position enabling shut-off of the mixture of water-and-air flow, and an operation of the control valve being facilitated by a water pressure of water in the water hose; and a control member movably coupled with the faucet head, the control member comprising:

a driving portion having a knob being used for user operation in a direction perpendicular to a side surface of the faucet head and a first magnet mechanically coupled to the knob, and a second magnet magnetically coupled with the first magnet when the knob is pressed, the second magnet being engaged with the control valve in a way to move the control valve from the second position to the first position of the control valve when the knob is pressed.

* * * * *